(12) United States Patent
Ferraz et al.

(10) Patent No.: US 10,323,775 B2
(45) Date of Patent: Jun. 18, 2019

(54) PIPE SUPPORT SYSTEM

(71) Applicant: Braskem America, Inc., Philadelphia, PA (US)

(72) Inventors: Javier Pac Luis Ferraz, São Paulo (BR); Ivo Andrei Oliveira Lino Lima, São Paulo (BR); Diercio Galdino da Silva Neto, São Paulo (BR); Alessandro Bernardi, São Paulo (BR)

(73) Assignee: Braskem America, Inc., Philadelphia, PA (US)

( * ) Notice: Subject to any disclaimer, the term of this patent is extended or adjusted under 35 U.S.C. 154(b) by 0 days.

(21) Appl. No.: 15/024,651

(22) PCT Filed: Sep. 26, 2013

(86) PCT No.: PCT/BR2013/000367
§ 371 (c)(1),
(2) Date: Jul. 14, 2016

(87) PCT Pub. No.: WO2015/042671
PCT Pub. Date: Apr. 2, 2015

(65) Prior Publication Data
US 2016/0312922 A1 Oct. 27, 2016

(51) Int. Cl.
*F16L 3/26* (2006.01)
*F16L 3/00* (2006.01)
*F16L 3/08* (2006.01)
*F16L 3/24* (2006.01)

(52) U.S. Cl.
CPC ................... *F16L 3/26* (2013.01); *F16L 3/00* (2013.01); *F16L 3/08* (2013.01); *F16L 3/24* (2013.01)

(58) Field of Classification Search
CPC ....... F16L 3/26; F16L 3/08; F16L 3/00; F16L 3/24

USPC .................................................. 248/72, 74.1
See application file for complete search history.

(56) References Cited

U.S. PATENT DOCUMENTS

| | | | |
|---|---|---|---|
| 3,304,115 A * | 2/1967 | Brooks | B66C 1/10 294/81.1 |
| 3,358,953 A * | 12/1967 | Bethea, Jr. | H02G 7/053 174/169 |
| 4,424,547 A * | 1/1984 | Titus | H01T 4/02 315/36 |
| 4,854,766 A * | 8/1989 | Hein | B60G 21/0551 403/224 |
| 5,028,020 A * | 7/1991 | Sundholm | F16L 3/18 248/219.4 |
| 5,127,668 A * | 7/1992 | Raidel | B60G 7/02 280/124.116 |

(Continued)

FOREIGN PATENT DOCUMENTS

| CN | 2924226 Y | 7/2007 |
|---|---|---|
| CN | 201344316 Y | 11/2009 |

(Continued)

OTHER PUBLICATIONS https://en.wikipedia.org/wiki/Ultra-high-molecular-weight_polyethylene.*

*Primary Examiner* — Muhammad Ijaz
(74) *Attorney, Agent, or Firm* — Duane Morris LLP

(57) ABSTRACT

The present invention is related to a pipe support system comprising a sleeper, a metallic bar and a polymeric material pad coating said metallic bar or, optionally, a polymeric material support on which the pipe is supported, wherein said polymeric material support is attached on both sides by bars welded to the sleeper.

12 Claims, 4 Drawing Sheets

(56) References Cited

U.S. PATENT DOCUMENTS

| | | | | |
|---|---|---|---|---|
| 5,746,479 | A * | 5/1998 | Bodnar | A47C 7/546 297/411.23 |
| 5,961,248 | A * | 10/1999 | Tourtellotte | F16B 7/0493 403/385 |
| 6,142,428 | A * | 11/2000 | Kamata | F16L 3/1207 248/49 |
| 6,991,198 | B1 * | 1/2006 | Roth | F16B 2/065 248/58 |
| 7,770,848 | B2 * | 8/2010 | Johnson | F16L 3/1207 248/65 |
| 8,882,092 | B2 * | 11/2014 | Jang | B60G 21/0551 267/141 |
| 2001/0049504 | A1 * | 12/2001 | Gautsche | A61M 5/1418 604/174 |
| 2008/0269904 | A1 * | 10/2008 | Voorhies | A61B 17/7026 606/86 A |
| 2010/0102104 | A1 * | 4/2010 | Tanimoto | B25C 1/06 227/146 |
| 2010/0294389 | A1 * | 11/2010 | Souza | F16L 3/02 138/110 |
| 2011/0172711 | A1 * | 7/2011 | Kirschman | A61B 17/7068 606/252 |
| 2012/0214328 | A1 * | 8/2012 | Downing | F16L 3/00 439/345 |
| 2014/0306406 | A1 * | 10/2014 | Hibberd | E21B 33/1208 277/336 |
| 2016/0312922 | A1 * | 10/2016 | Ferraz | F16L 3/00 |
| 2017/0204993 | A1 * | 7/2017 | Eljaouhari | F16L 3/1091 |

FOREIGN PATENT DOCUMENTS

| | | |
|---|---|---|
| CN | 202349395 U | 7/2012 |
| JP | H10267188 A | 10/1998 |
| JP | 2010065838 A | 3/2010 |

* cited by examiner

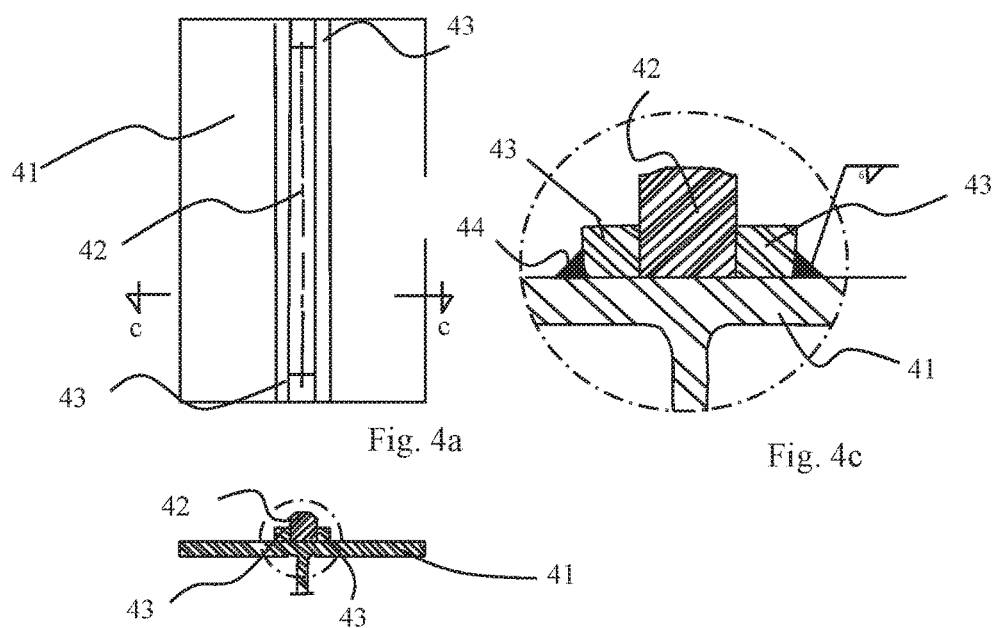

PIPE SUPPORT SYSTEM

TECHNICAL FIELD

The present invention is related to non-isolated pipe support systems.

DESCRIPTION OF THE STATE OF THE ART

Several pipe support systems are known from the state of the art. The most common form used is to simply support the pipe on a sleeper to prevent the same from deforming due to the action of gravity Many of these sleepers are made of metallic material in order to render them more resistant.

However, the fact that the pipes are directly supported on a bar causes a gap between the lower generatrix of the non-isolated pipes and the support beam. This gap generates a potential difference by differential aeration causing intensive and localized corrosion upon water or moisture build-up. In addition, these spots are difficult to be inspected and maintained.

In the current state of the art, the most used pipe support solutions are welded shoe, a polymeric material web (for example, neoprene, polyethylene tape) to be used with a U-shaped clamp and welded chute.

From these known solutions, the welded shoe is the option commonly chosen to address this issue, as it eliminates the gap and corrosion of the lower generatrix of the pipe in addition to allowing for inspection and maintenance of the pipes. Nevertheless, this solution has the drawback of requiring pre-manufacture in addition to requiring welding in the field, which increases complexity of the installation. Further, the welded shoe is a hard to be applied solution for small gauge-pipes.

To prevent corrosion in these small gauge lines, the use of a polymeric web surrounding the pipe to prevent the direct contact thereof with the sleeper is known in the state of the art. However, over time, the web allows for moisture infiltration between it and the pipe, which causes an even more intense corrosion due to the creation of a closed corrosive system.

The welded chute is widely used in existing, already installed pipes which already exhibit localized corrosion and cannot be suspended for a shoe to be installed or for a cutting and welding operation to be performed. However, in this solution no gaps are formed between the chute and the metallic bar causing localized corrosion in the chute, which in some cases may propagate to the pipe, allowing for the ingress of moisture between the chute and the pipe through failures in the chute, which causes the corrosion process to be more critical for generating a closed environment with no access for inspection.

Document CN201344316 (Y) describes an assembly comprising a U-shaped clamp coated with a polymeric material used for supporting and fixing the pipe, the end of said U-shaped clamp being threaded and a polymeric bar to support the pipe substituting the metallic bar. FIG. 1 schematically illustrates this assembly, wherein the U-shaped clamp 100, coated with a polymer layer 101 and threaded in the ends 102, is engaged to the polymeric bar 201, and this assembly is attached to the sleeper through threads. This support system has the advantage of eliminating the electrochemical corrosion since the contact is plastic (polymeric bar)-metal (beam).

However, to use this assembly there is a need for the pipe to be supported on metallic sleepers for fixing the U-shaped clamp to the polymeric bar and cannot be installed, for example, on concrete sleepers, since the assembly is screwed to the sleeper. In cases where the pipe is supported on bars, it cannot be used as well, since the assembly is installed with a polymeric bar that provides such support for the pipe as a replacement to the metallic bar. Thus, for this assembly to he fixed, the metallic sleeper bar would have to be removed, making installation thereof difficult.

Further, another restriction of the application of this solution is that a single assembly can be installed for each pipe, since each U-shaped clamp supports only one pipe, not several pipes at once.

Also, other pipe supports intended to prevent corrosion are described in documents CN202349395 U, JP10267188 A, CN2924226 Y and JP2010065838 A. In these documents, the supports have a structure that is similar to that of document CN201344316 (Y) cited above, as they also comprise a clamp assembly with a bar to support the pipe, rendering the installation more complex and expensive in addition to allowing for the installation of a single pipe for each support.

There is, therefore, the need for a support system for a metallic pipe that prevents corrosion by differential aeration or by gaps in the bearing points, which is simple to be installed, can be fixed to both metallic and concrete sleepers and can be used in already existing pipes, in addition to having lower cost.

OBJECTS OF THE PRESENT INVENTION

The object of the present invention is to provide a pipe support system that prevents corrosion in the bearing points, is simple to be installed, can be fixed to both metallic and concrete sleepers and can be used in already existing pipes with already installed bars without the need for removing them, in addition to having lower costs.

SUMMARY OF THE INVENTION

In order to achieve the above objects, in a first preferred configuration, the pipe support system of the present invention comprises at least one sleeper, at least one metallic bar and a polymeric material coating said metallic bar on at least one contact point with the pipe.

In a second configuration, the support system comprises at least one sleeper and at least one polymeric material pad, wherein said polymeric material pad is supported on the sleeper and is attached to the same through at least two attachment means.

DESCRIPTION OF THE FIGURES

The above and further advantages of this invention may be better understood by referring to the following description, taken in conjunction with the accompanying drawings:

FIG. 2a illustrates a top view of the first configuration;

FIG. 2b illustrates a cross-section view (CC cut) of the system of FIG. 2a; and

FIG. 2c shows a view of the detail of FIG. 2b;

FIG. 3a illustrates a top view of the first configuration with the shape variant of the metallic bar;

FIG. 3b illustrates the CC cut of the system of FIG. 3a; and

FIG. 3c shows a view of the detail of FIG. 3b;

FIGS. 4a-4c show a second configuration of the metallic pipe support system of the present invention;

FIG. 4a illustrates a top view of the second configuration;

FIG. 4b illustrates the CC cut of the system of FIG. 4a; and

FIG. 4c shows a view of the detail of FIG. 4b.

DETAILED DESCRIPTION OF THE INVENTION

The following description will be based on possible embodiments of the invention. As will be evident to the skilled person, however, the invention is not restricted to these particular embodiments.

The present invention relates to a metallic pipe support system consisting of a polymeric material coating a metallic bar attached to the sleeper and supporting the pipe, so as to render the system more resistant. In another configuration, as will be apparent from the following description, the support on which the pipe is supported comprises polymeric material and is supported on a sleeper, hence preventing the metal-metal contact in the bearing points.

In a first configuration of the present invention a metallic bar, that is part of the pipe support, is supported on a sleeper and completely surrounded or surrounded at least on the contact point between the bar and the pipe by a polymeric material, hence preventing a the onset of a corrosion process that was likely to occur at the contact between the two metals. Preferably, the sleeper comprises metallic material or concrete. Where the sleeper is made of concrete, it should preferably comprise a metallic plate on the surface for the bar to be welded to the sleeper.

Metallic bars used to support the pipe can be of various cross-section shapes, such as for example, circular, oval, square, rectangular, polygonal, hexagonal shapes, among others and have several sizes. In addition, they can be attached to the sleeper by means of welding, a clamp, bolts, and other types of fasteners.

Figure 1:
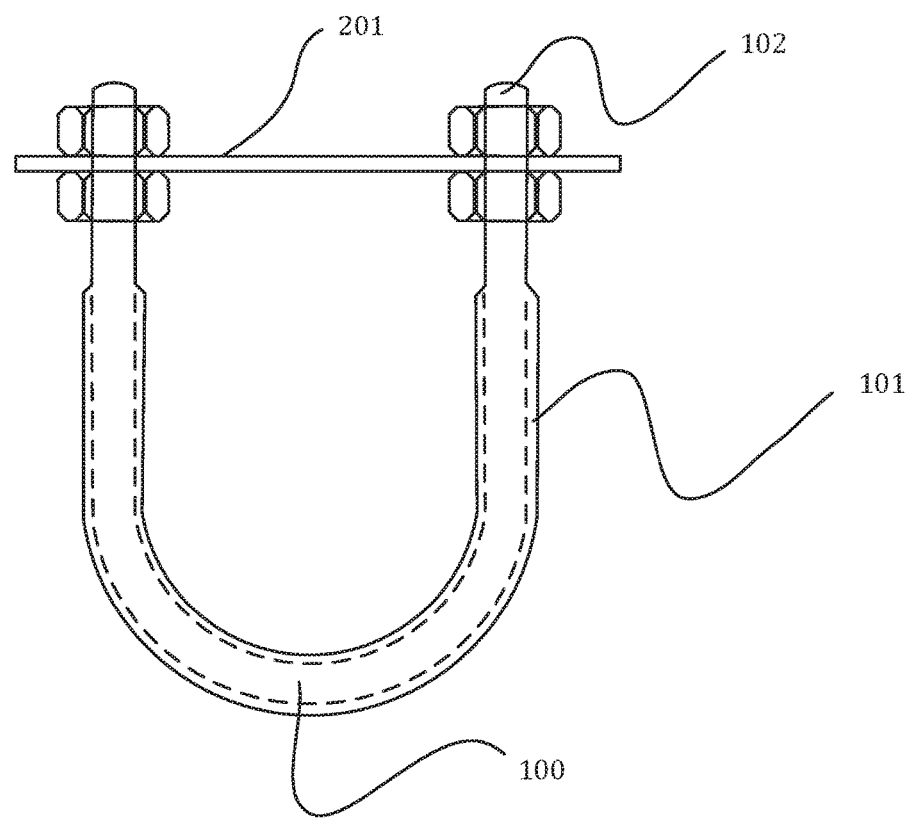
FIG. 1 illustrates a pipe support assembly already from the state of the art.
Figure 1:
Figure 2A:
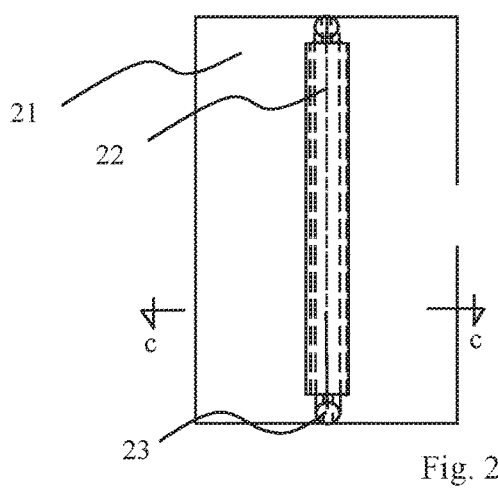
FIGS. 2a-2c show a first configuration of the metallic pipe support system of the present invention.
Figure 2C:
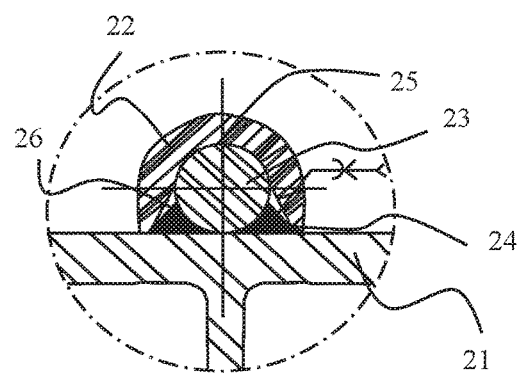
Figure 3A:
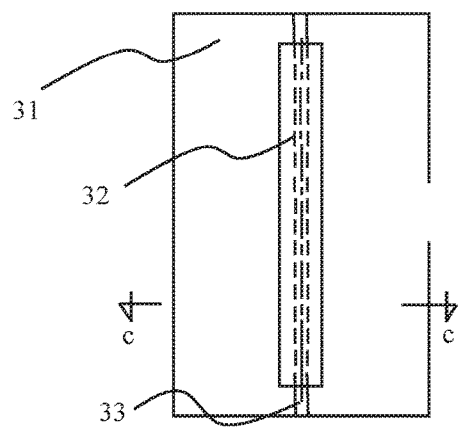
FIGS. 3a-3c show the first configuration of the metallic pipe support system of the present invention with a shape variant of the metallic bar.
Figure 3C:
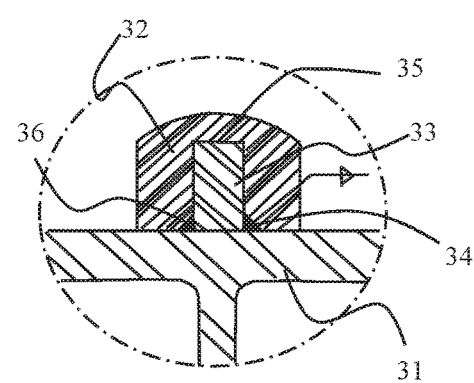

Preferably, the inner surface of the polymer material, as illustrated in FIGS. 2c and 3c (25, 35), surrounding the metallic bar has the same shape as said metallic bar, to tightly fit to the metallic bar and prevent displacement of the polymer material. In the present invention, what is meant by tight fit is to fit the polymeric material to the metallic bar with no clearances. In addition, optionally, the polymeric material can contain bevels (26, 36) for engagement to said metallic bar preventing interference with the weld. Due to the snug fit to the metallic bar and the weight of the pipe that will be supported on the polymeric material, there is no need for an additional attachment process. However, in instances where the polymeric material is only attached on the contact point of the metallic bar with the pipe, a suitable fixation material should be used on the contacting surface between the metallic bar and the polymeric material to prevent the polymeric material from moving from the contact position with the tube.

Preferably, an elastomeric sealant is used throughout the contact perimeter of the metallic bar with the polymeric material to prevent the ingress of moisture, primarily through the bevels at the inner longitudinal end, as illustrated in FIGS. 2c and 3c (26, 36) of the polymeric material, thereby preventing corrosion at this localized area. What is meant by elastomeric sealant is any impermeable adhesive sealant made of elastomeric resins.

Preferably, the polymer material used for the pipe support system is ultra-high molecular weight polyethylene, more preferably UTEC 6541® manufactured by Braskem S.A. Said polymeric material is advantageous as it presents good mechanical strength that is consistent with metals, very low friction coefficient, is resistant to atmospheric stresses (rain and sun/UV rays), has good machinability and is light weight.

An additional advantage of the present invention is that polymeric materials are easy to be handled and cut, as compared to traditional metallic supports of the state of the art. Therefore, the pipe support system of the present invention can be adjusted to the suitable size or shape, being therefore adaptable to any size or shape of pipe, making installation and maintenance easier. Similarly, the system can be shaped to be applied to the entire length of the sleeper and, as a consequence, can support more than one line at the same time.

Figure 2B:
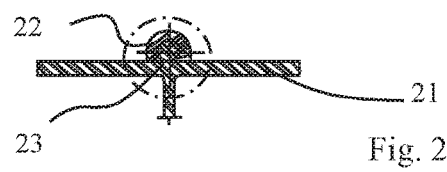

FIGS. 2a-2c illustrate a first configuration of the present invention. In said configuration, the metallic bar of circular cross-section that supports the pipe is supported on a sleeper and surrounded by a polymeric material sleeve, therefore preventing a corrosion that was likely to occur at the contact between the two metals.

In FIG. 2c one notes a cross section of the configuration of FIG. 2a, wherein the metallic bar of circular cross-section 23 is supported and attached to the sleeper 21 through weld 24. The polymeric material 22 of the system of the present invention is engaged on the metallic bar of circular cross-section so as to surround the metallic structure. Said polymeric material contains bevels for engagement to said metallic bar, preventing interference with the weld.

Figure 3B:
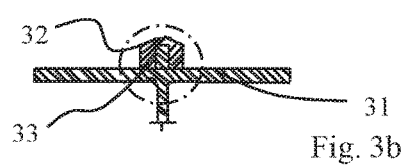

In a similar manner, FIGS. 3a-3c illustrate a bar of rectangular cross-section surrounded by the polymeric material and attached to a sleeper as a support to the pipe. In FIG. 3c it is noted that a bar of rectangular cross-section 33, just like in FIG. 2c, is fixed to the sleeper 31 by weld 34. The polymeric material 32 is suitably shaped for the inner surface 35 thereof to coat the metallic bar of rectangular cross-section hence eliminating corrosion.

FIGS. 4a-4c illustrate a second configuration of the metallic pipe support system of the present invention, where the polymeric material pad replaces the metallic bar used in traditional structures. In this alternative, there are used two side elements positioned longitudinally and tightly in relation to the pad, which in turn fix the polymeric material pad, thus preventing the same from moving on the sleeper. The sleeper can consist of metallic material or concrete. Where the sleeper is made of concrete, it should preferably comprise a metallic plate on the upper surface for the side elements to be welded to the sleeper. Alternately, the support system can exhibit other configurations, wherein the polymeric material pad is attached through clamps, pins on the sides attached to the sleeper, clips, staples, attached using glue, silicone or another type of sealant.

As illustrated in FIGS. 4a, 4b and 4c, two metallic side elements 43 are attached by welding 44 to the sleeper 41. Among them, a polymeric material pad 42 is engaged, which should have the shape and height required to support the pipe.

Preferably, a sealant should be applied to the contacting surface between the side elements and the polymeric material pad in order to prevent possible clearances in the installation, and avoiding the formation of gaps with consequent corrosion. The polymeric material pad preferably has semi-circular or straight shape. Preferably, the polymer material of the pad of the second configuration is ultra-high molecular weight polyethylene, wherein UTEC 6541® manufactured by Braskem S.A is preferred.

EXAMPLE

In order to demonstrate the efficacy and resistance of the pipe support system disclosed herein, a load test was made using the first configuration of the support system. The test was made in an internally-loaded pipe of 8 inches (20.32 cm) in diameter with a total load of 450 kgf in 6 meters, simulating extreme load conditions during assembly of the lines and/or during operation. The following load tests were carried out:

1. Rapid displacement of the pipe, with an approximate speed of 3 m/s, a value that is higher than the displacement caused by pipe dilation, simulating sliding of the pipe on the support system for mounting the pipeline;
2. Free fall of the pipe from a height of 0.5 m on the metallic bar coated with the polymeric material;
3. Simulation of a weld string with a 2 mm reinforcement being displaced on the polymeric material at approximately 3 m/s;

All tests showed positive results, not presenting any deformation of the polymeric material in items 1 and 2, only minor superficial marks in item 3 due to the protrusion of the weld moving at a speed of 3 m/s but not preventing suitable sliding of the pipe for assembly.

Several variations under the scope of protection of the present application are possible. Therefore, the present invention is not limited to the aforementioned particular configurations/embodiments.

What is claimed is:

1. A pipe support system comprising: at least one sleeper and at least one metallic bar, wherein the at least one metallic bar is coated at least on a pipe contact point with an ultra-high molecular weight polyethylene material,
   wherein the sleeper comprises an upper metallic surface and the metallic bar is attached to said sleeper by welding, and the ultra-high molecular weight polyethylene material comprises bevels in an inner longitudinal end.

2. The system according to claim 1, wherein the metallic bar has a circular cross-section shape.

3. The system according to claim 1, wherein the metallic bar has a rectangular cross-section shape.

4. The system according to claim 1, wherein the inner surface of the ultra-high molecular weight polyethylene material is tightly fitted to the metallic bar.

5. The system according to claim 1, wherein the system further comprising comprises an elastomeric sealant on a contacting surface between the metallic bar and the ultra-high molecular weight polyethylene material.

6. The system according to claim 1, wherein the ultra-high molecular weight polyethylene material surrounds the contact point between the metallic bar and the pipe.

7. A pipe support system comprising:
   at least one sleeper;
   a pad; and
   at least one metallic bar, said at least one metallic bar coated at least on a pipe contact point with an ultra-high molecular weight polyethylene material, wherein said pad is supported on said sleeper and attached to the sleeper through at least two attachment means, wherein the sleeper comprises an upper metallic surface and metallic side elements are attached to said sleeper by welding, wherein the ultra-high molecular weight polyethylene material comprises bevels in an inner longitudinal end.

8. The system according to claim 7, wherein the attachment means are metallic side elements positioned longitudinally and tightly in relation to the ultra-high molecular weight polyethylene material pad.

9. The system according to claim 7, wherein the attachment means are clamps, pins, clips, staples or sealants.

10. The system according to claim 7, wherein the system further comprises an elastomeric sealant on the contacting surface between the metallic side elements and the ultra-high molecular weight polyethylene material pad.

11. The system according to claim 7, wherein an upper surface of the ultra-high molecular weight polyethylene material pad has a semi-circular or straight shape.

12. A pipe with a pipe support system comprising: the pipe, at least one sleeper and at least one metallic bar, characterized in that the at least one metallic bar is coated at least on a pipe contact point with an ultra-high molecular weight polyethylene material, wherein the sleeper comprises an upper metallic surface and the metallic bar is attached to said sleeper by welding, and the ultra-high molecular weight polyethylene material comprises bevels in an inner longitudinal end.

* * * * *